(12) United States Patent
Schwartz

(10) Patent No.: US 9,995,428 B2
(45) Date of Patent: Jun. 12, 2018

(54) PORTABLE CONFIGURABLE SUPPORT DEVICE

(76) Inventor: Dean Schwartz, Los Angeles, CA (US)

( * ) Notice: Subject to any disclaimer, the term of this patent is extended or adjusted under 35 U.S.C. 154(b) by 0 days. days.

(21) Appl. No.: 13/065,294

(22) Filed: Mar. 17, 2011

(65) Prior Publication Data

US 2012/0235008 A1  Sep. 20, 2012

Related U.S. Application Data

(60) Provisional application No. 61/315,246, filed on Mar. 18, 2010.

(51) Int. Cl.
*A47G 1/24* (2006.01)
*F16M 11/38* (2006.01)
*A47B 23/04* (2006.01)
*F16M 11/10* (2006.01)
*F16M 13/00* (2006.01)

(52) U.S. Cl.
CPC ............ *F16M 11/38* (2013.01); *A47B 23/04* (2013.01); *F16M 11/10* (2013.01); *F16M 13/00* (2013.01)

(58) Field of Classification Search
CPC combination set(s) only.
See application file for complete search history.

(56) References Cited

U.S. PATENT DOCUMENTS

| | | | |
|---|---|---|---|
| 756,486 A | 4/1904 | Fleming | |
| 1,659,395 A * | 2/1928 | Douglas | 402/70 |
| 2,374,409 A * | 4/1945 | Gallagher | 248/453 |
| 3,381,928 A * | 5/1968 | White | 248/455 |
| 4,240,761 A * | 12/1980 | Jacobson | 402/76 |
| 4,470,571 A * | 9/1984 | Hartman | 248/452 |
| 4,555,128 A | 11/1985 | White | |
| 4,624,433 A * | 11/1986 | Henneberg | 248/346.06 |
| 4,765,462 A * | 8/1988 | Rose, Jr. | 206/760 |
| 4,982,925 A * | 1/1991 | Hinderliter | 248/455 |
| 5,056,743 A * | 10/1991 | Zwar et al. | 248/118 |
| 5,209,452 A * | 5/1993 | Goldberg | 248/676 |
| 5,290,002 A * | 3/1994 | Cohen | 248/456 |
| 5,341,929 A * | 8/1994 | Stefancin, Jr. | 206/320 |
| 5,375,800 A * | 12/1994 | Wilcox et al. | 248/118.1 |
| 5,433,407 A * | 7/1995 | Rice | 248/118.1 |
| 5,555,614 A * | 9/1996 | Book | 29/401.1 |
| 5,607,054 A * | 3/1997 | Hollingsworth | 206/320 |
| 5,651,525 A | 7/1997 | Yang | |
| 5,722,628 A * | 3/1998 | Menaged | 248/441.1 |
| 5,775,497 A * | 7/1998 | Krulik | 206/320 |
| 5,797,578 A * | 8/1998 | Graffeo et al. | 248/453 |
| 5,826,840 A * | 10/1998 | Yun | 248/118 |
| 5,971,332 A * | 10/1999 | Sun et al. | 248/118 |
| 6,098,952 A * | 8/2000 | Tonn | 248/688 |

(Continued)

*Primary Examiner* — Monica E Millner
(74) *Attorney, Agent, or Firm* — Edwin Tarver

(57) ABSTRACT

A portable configurable support device includes a base panel, a ledge positioned at the bottom of the base panel for enabling an item to rest on the base panel; a bottom panel, a support panel, a first hinge for connecting the base panel to the bottom panel along one edge of each panel, and a second hinge for connecting the base panel to the support panel along an opposite edge of the base panel.
The stops are formed in the bottom panel for enabling the edge of the support panel that is opposite to the second hinge to be positioned therein, to thereby enable the base panel to be positioned at a desired angle of incline with respect to the plane defined by the bottom panel.

1 Claim, 7 Drawing Sheets

(56) References Cited

U.S. PATENT DOCUMENTS

| | | | |
|---|---|---|---|
| 6,213,439 B1* | 4/2001 | Giulie et al. | 248/459 |
| 6,256,193 B1 | 7/2001 | Janik | |
| 6,305,652 B1* | 10/2001 | Borke et al. | 248/174 |
| 6,386,500 B1* | 5/2002 | Dainoff et al. | 248/451 |
| 6,496,360 B1* | 12/2002 | Cordes et al. | 361/679.09 |
| 6,543,949 B1* | 4/2003 | Ritchey et al. | 400/691 |
| 6,545,864 B2 | 4/2003 | Davis, IV | |
| 6,604,618 B1* | 8/2003 | Godshaw et al. | 190/107 |
| 7,129,931 B2 | 10/2006 | Pappas | |
| 7,333,327 B1* | 2/2008 | Ho et al. | 361/679.55 |
| 7,334,768 B1* | 2/2008 | Lum | 248/444 |
| 7,828,260 B2* | 11/2010 | Hauser et al. | 248/456 |
| 8,038,116 B2* | 10/2011 | Lee et al. | 248/463 |
| 8,056,871 B2* | 11/2011 | Matias | 248/176.1 |
| 8,746,645 B2* | 6/2014 | Knych | 248/346.01 |
| 2002/0003197 A1* | 1/2002 | MacEachern | 248/346.01 |
| 2004/0007649 A1* | 1/2004 | Vettraino | 248/127 |
| 2006/0192070 A1* | 8/2006 | Chan | 248/371 |
| 2006/0237615 A1* | 10/2006 | Thomas | 248/346.01 |
| 2007/0018000 A1* | 1/2007 | Jeun et al. | 235/486 |
| 2008/0006749 A1* | 1/2008 | Ferritto | 248/188.6 |
| 2008/0062624 A1 | 3/2008 | Regen | |
| 2009/0179132 A1* | 7/2009 | Qin et al. | 248/371 |
| 2010/0110629 A1* | 5/2010 | Dietz et al. | 361/679.55 |
| 2010/0122924 A1* | 5/2010 | Andrews | 206/320 |
| 2012/0138766 A1* | 6/2012 | Chen | 248/456 |

* cited by examiner

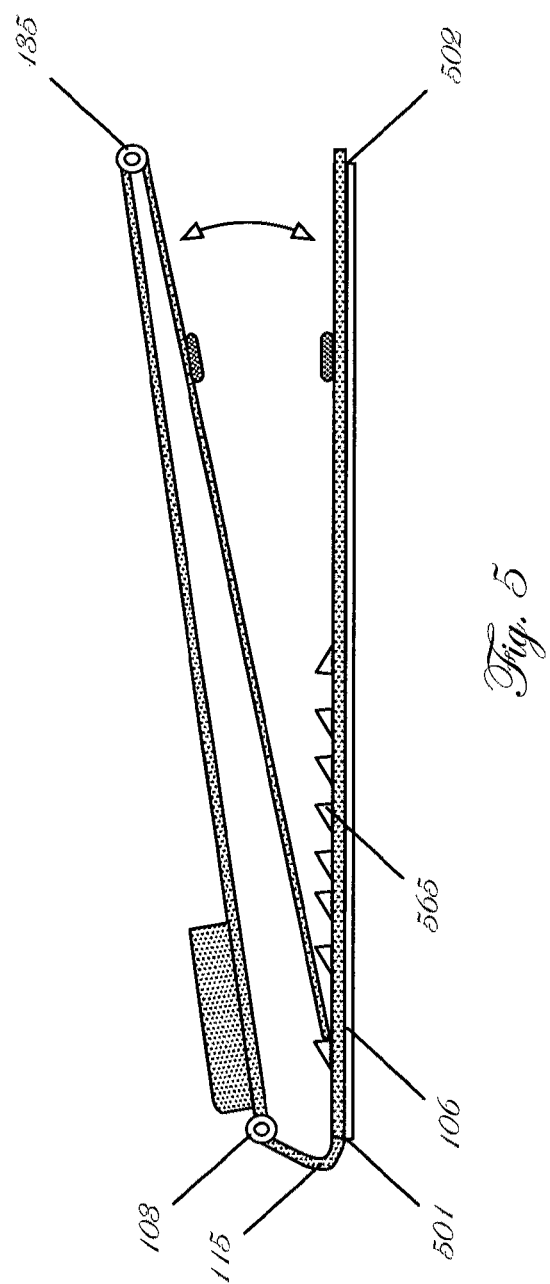

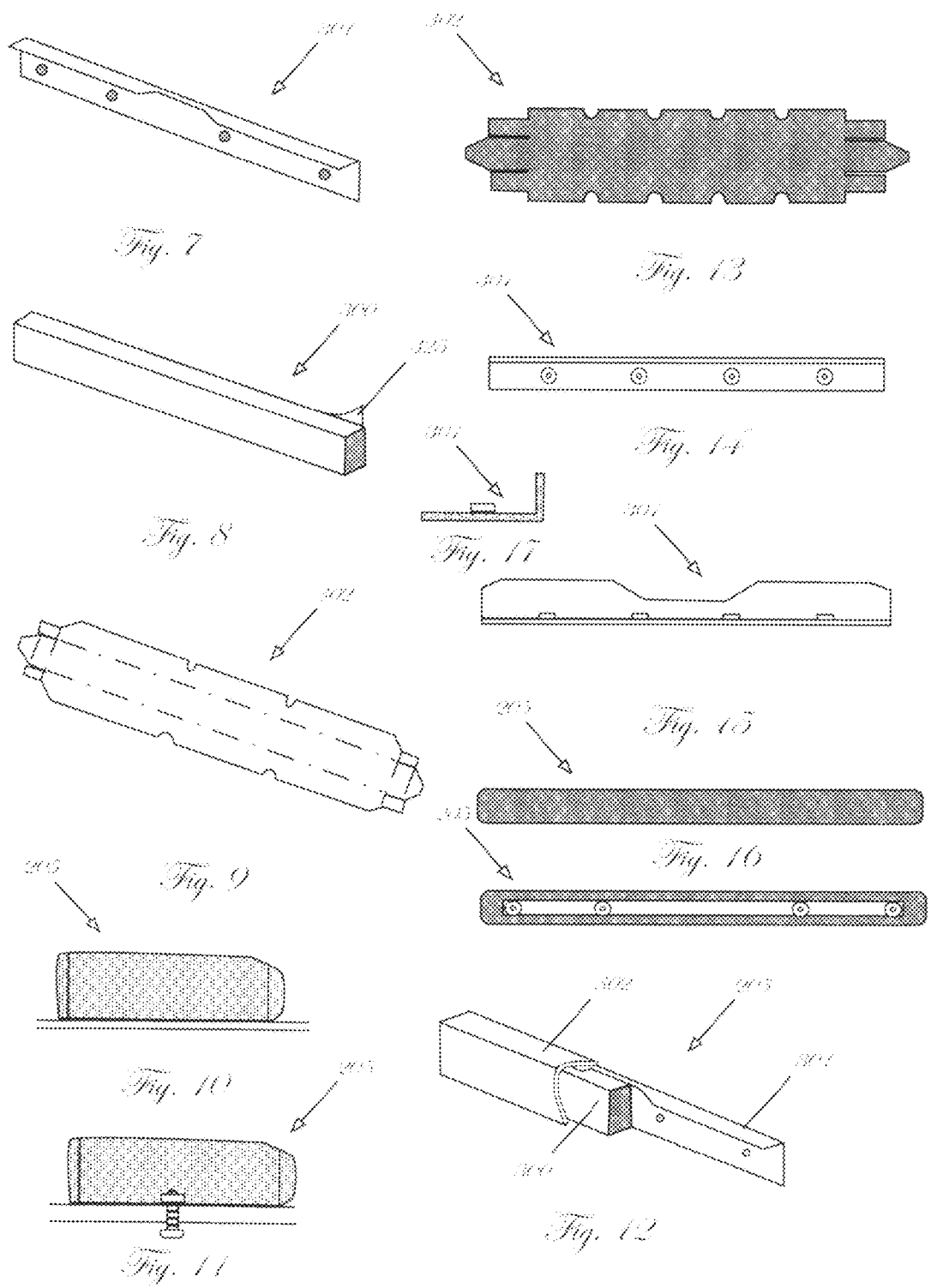

PORTABLE CONFIGURABLE SUPPORT DEVICE

CROSS REFERENCE

The present patent application incorporates pending Provisional Patent Application 61/315,246 filed Mar. 18, 2010. The present application hereby claims priority to the original filing date of said provisional patent application entitled "A Portable Configurable Support Device".

FIELD OF THE INVENTION

The invention relates to support devices for holding laptop computers, books and the like, for use by people in a variety of positions, including sitting, reclining, or lying supine.

BACKGROUND OF THE INVENTION

Laptop computers are being used more and more for work, entertainment, and other purposes in a variety of locations. For example, a user may wish to surf the internet using a laptop while lying in bed or reclining in a chair, or reading a book, or an electronic book (e-book).

Currently, there are a number of portable support devices or stands known in the art that are designed to hold a laptop computer, e-book, textbook, or the like. However, these stands do not provide sufficient utility in many situations and positions. They tend to be limited in their functionality and comfort, they are not compact in size, and they are constructed with non-durable materials. Some support devices require clips or straps to hold the item being supported and some do not include any means of supporting the item.

One thing that prior art stands also typically do not take into account is the need to provide a heat conductive surface that helps protect a laptop from overheating and to protect the user from the heat generated by the laptop. In addition, the bottom surfaces of prior art stands often cause scratching of the surfaces it is placed on or pinching of the user.

SUMMARY OF THE INVENTION

Broadly stated, the present invention is a portable configurable support device comprising: a base panel; a ledge positioned at the bottom of the base panel for enabling an item to rest on the base panel; a bottom panel; a support panel; a first hinge for connecting the base panel to the bottom panel along one edge of each panel; and a second hinge for connecting the base panel to the support panel along an opposite edge of the base panel; wherein a plurality of stops are formed in the bottom panel for enabling the edge of the support panel that is opposite to the second hinge to be positioned therein, to thereby enable the base panel to be positioned at a desired angle of incline with respect to the plane defined by the bottom panel. The invention also preferably incorporates a wrist pad with an encased ledge for supporting the hands of a user of the support device and for cushioning the laptop or other device.

The support device according to the present invention is preferably made of aluminum, which naturally dissipates heat and can be used as a permanent accessory to the laptop, even during charging. Having a protected bottom panel, the support device will not scratch a surface it is resting on, nor pinch. It can be used on a desk, in a chair, or in bed, and can be easily packed into a brief case or computer bag due to its size and weight. The design disperses weight over a large footprint to minimize the feeling of weight that can otherwise fatigue the user.

BRIEF DESCRIPTION OF THE DRAWING FIGURES

The features, advantages, and benefits of the present invention will become more apparent from the following description taken in conjunction with the accompanying drawings, which are presented solely for exemplary purposes and not with the intent to limit the invention thereto, and in which:

FIG. 5 shows a side elevation view of a preferred embodiment of the present invention.

FIG. 7 is a perspective view of a preferred embodiment of the present invention.

FIG. 8 is a perspective view of a preferred embodiment of the present invention.

FIG. 9 is a perspective view of a preferred embodiment of the present invention.

FIG. 10 is a side elevation view of a preferred embodiment of the present invention.

FIG. 11 is a side elevation view of a preferred embodiment of the present invention.

FIG. 12 is a perspective view of a preferred embodiment of the present invention.

FIG. 13 is a plan view of a preferred embodiment of the present invention.

FIG. 14 is a plan view of a preferred embodiment of the present invention.

FIG. 15 is a side elevation view of a preferred embodiment of the present invention.

FIG. 16 is a plan view of a preferred embodiment of the present invention.

FIG. 17 is a side elevation view of a preferred embodiment of the present invention.

DESCRIPTION OF PREFERRED EMBODIMENTS

The Support Device 100 according to the present invention can be used with any laptop or electronic reader, and can be made in 13", 14", 15", 16", 17" wide versions, or any other size that is desired for accommodating a laptop, book or e-book. It can also be used as a music stand and even as a surface for food being eaten in bed or while the user is sitting in a chair. The support device is a multi-hinged tri-fold design made of aluminum that creates a secure usable surface positionable at one of several angles at the preference of the user.

Figure 1:
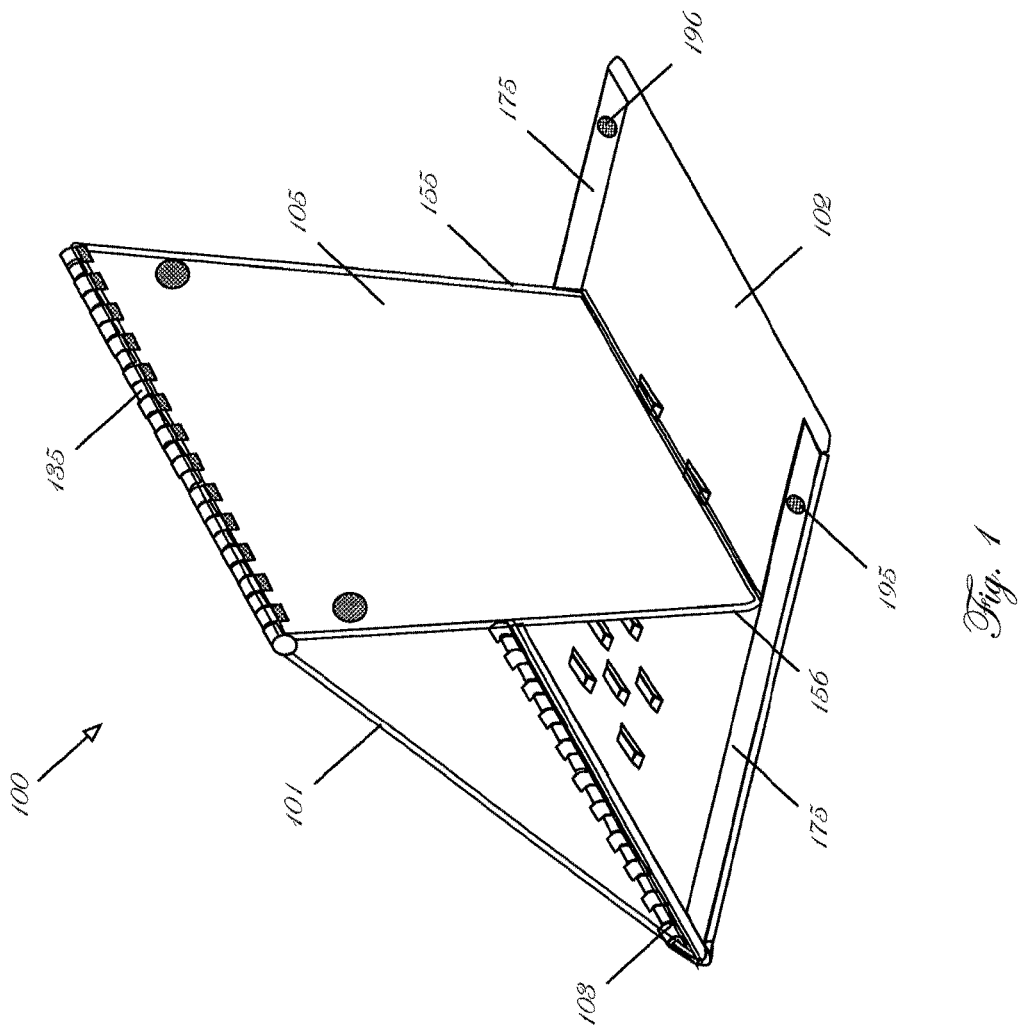
FIG. 1 shows a perspective front view of the support device according to the present invention in a fully lowered position.

FIG. 1 illustrates that in some preferred embodiments the Support Device 100 includes a tiltable base panel 101 that preferably has a range of motion of from 0 degrees to 54 degrees of incline with respect to the plane of a bottom panel 102. FIG. 5 illustrates that the bottom panel comprises an anterior side 501 and a posterior side 502. The base panel 101 is connected to the bottom panel 102 of the support device using a first hinge 103.

As described in greater detail below, a plurality of catches or stops 565 are formed in the bottom panel to make it possible for a user to incrementally raise the base panel (a total of 8 different positions in a preferred embodiment) by means of a third support panel 105. These height settings give the support device versatility of use in most any position of the user. The bottom panel is preferably made of 16 gauge aluminum. As best seen in FIG. 5, a non-skid neoprene or rubber material 106 is fastened to the underneath surface of the bottom panel with a high quality adhesive. The soft neoprene or rubber coating protects from sliding of the support device, and from damage to any clothing, skin, and furniture that may come in contact with the support device.

The bottom panel also has a series of supporting catches or stops punched into it by a die tool pushing upward in a way to catch on the edge of the support panel. The stops are pressed upward approximately ⅛th of an inch to 3/16ths of an inch, to catch on the edge of the support panel. These stops are placed as close as they can to the center of the bottom panel to eliminate the possibility of pinching clothing or skin. These stops enable the unit to be positioned at different angle settings (from 0 degrees to 54 degrees), and preferably a total of 8 stops.

Figure 6:
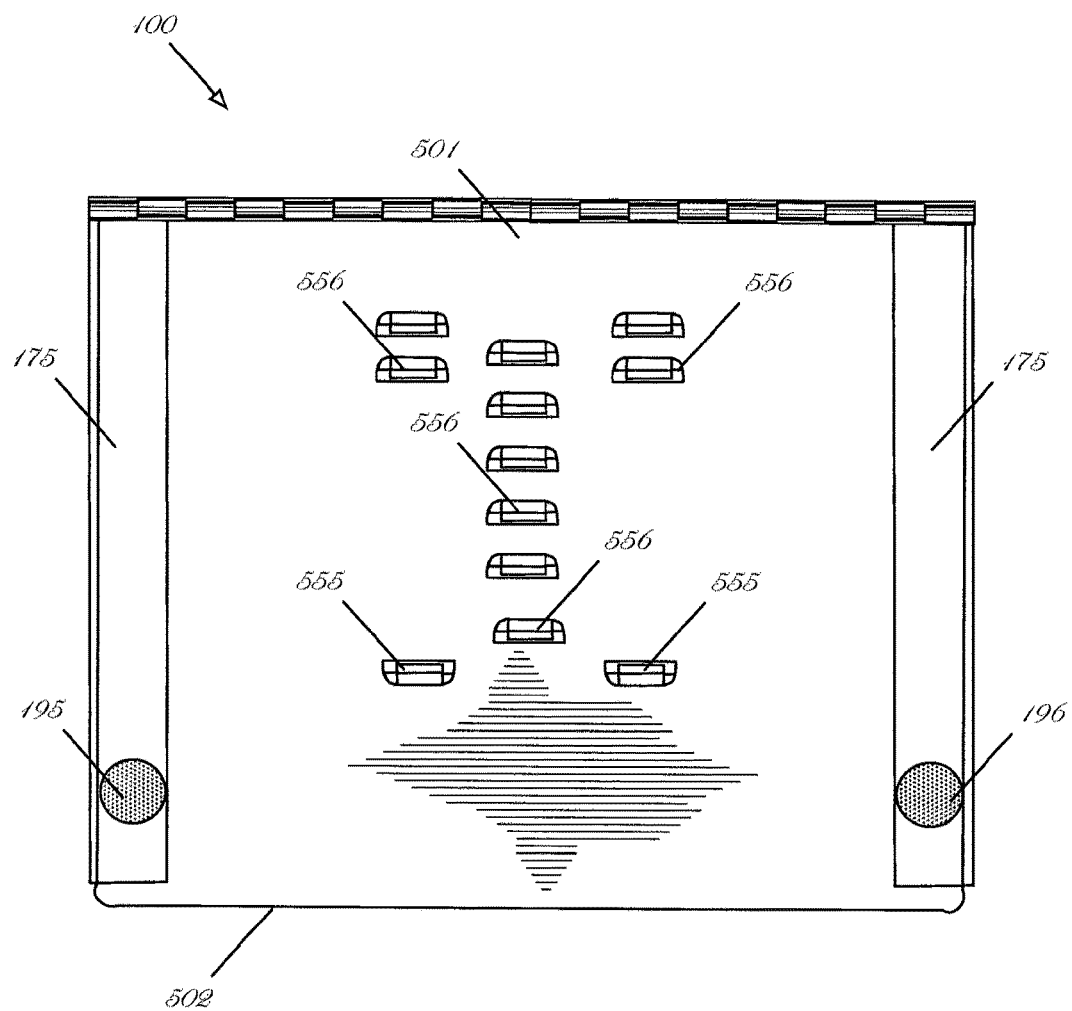
FIG. 6 is a plan view of a preferred embodiment of the present invention.
Figure 18:
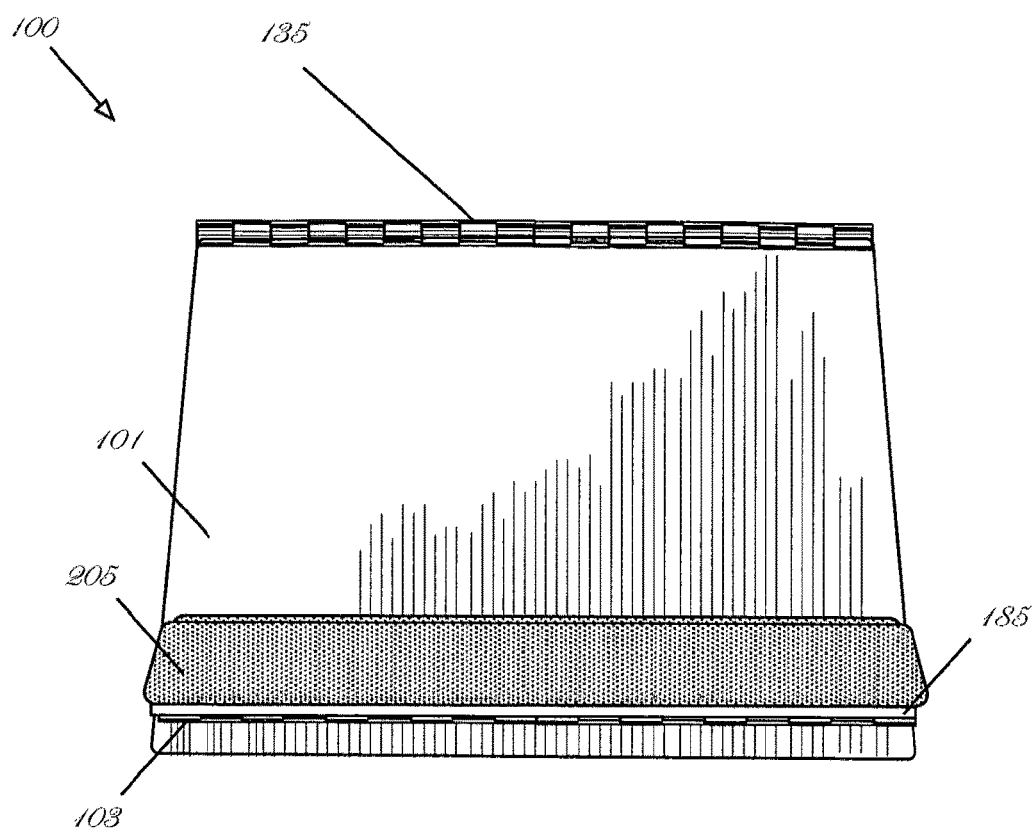
FIG. 18 is a frontal elevation view of a preferred embodiment of the present invention.

FIG. 6 illustrates that in some preferred embodiments, there may be two sets of stops. One set of anterior stops 555 face the anterior side of the bottom panel. The posterior stops 556 face the posterior side of the bottom panel.

The stops are all facing one direction at close intervals to catch on the support member edge, thus lowering or raising the height or degree of the angle. The last row of stops is pushed upward in an opposite direction to create a last stopping point at the highest setting. This last row of stops can act as a locking mechanism for the device.

The bottom panel has a bull nose 115 at its front or leading edge (to the user) to bring the hinge attached to the end edge of the bottom panel up and safely away from the user or surface that the unit's front may be against, thus preventing damage to furniture, clothing and skin. The bottom panel is attached to base panel by a built in first hinge 103 on the leading edge of both panels.

This built-in hinge attaches to base panel by the insertion of a round steel pin. This hinge is preferably formed in each of the panels and to eliminate the need for a separate part (hinge) and to lessen the possibility of failure of that part. Hinge halves are formed along the edges of panels and preferably by cutting the panels using a die cutting machine and then curling the resulting fingers into a circle using a curling tool.

A metal roll pin is pushed into the center of each of the two joined hinged halves to complete the construction of the hinge. The base panel is also preferably connected to the support panel by a second hinge 135 (ie rear hinge) formed in selected edges of each of these latter panels in the same fashion as the first hinge.

Figure 2:
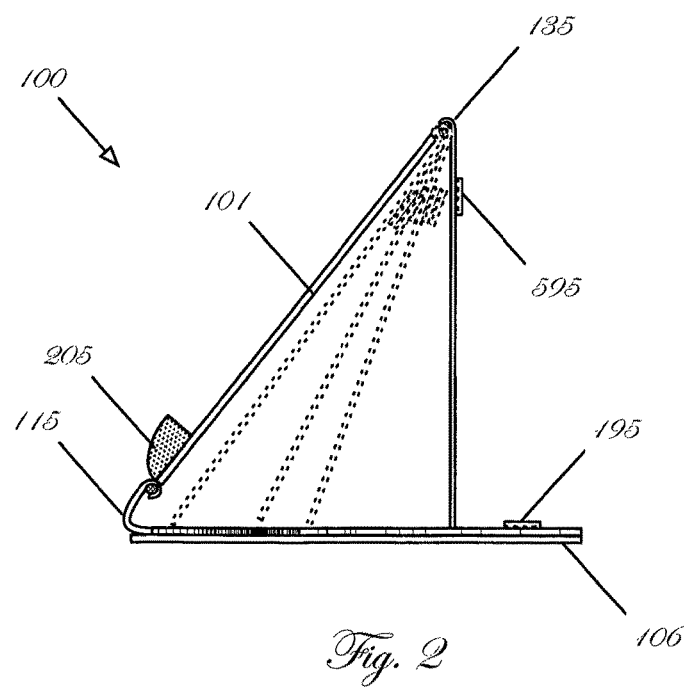
FIG. 2 is a side elevation view of a preferred embodiment of the present invention.

FIG. 2 illustrates that the rear hinge design enables the base panel to be positioned with the ease of simple, quick adjustments, and also gives the support device great stability. FIG. 2 also illustrates that in some preferred embodiments, the support panel can be swung back and forth as a function of this second hinge, enabling a user to position the support panel in a desired one of the stops formed in bottom panel, thereby allowing the incline angle of the support device to be increased or decreased with respect to the surface of base panel, as described above. The support panel therefore supports base panel and establishes the height, or raise of its usable surface, by catching on a selected one of the stops on panel.

The sides 155, 156 of the support panel are preferably gently tapered in at the bottom to accommodate a hem 175 formed in the side edges of the bottom panel, described below.

Figure 4A:
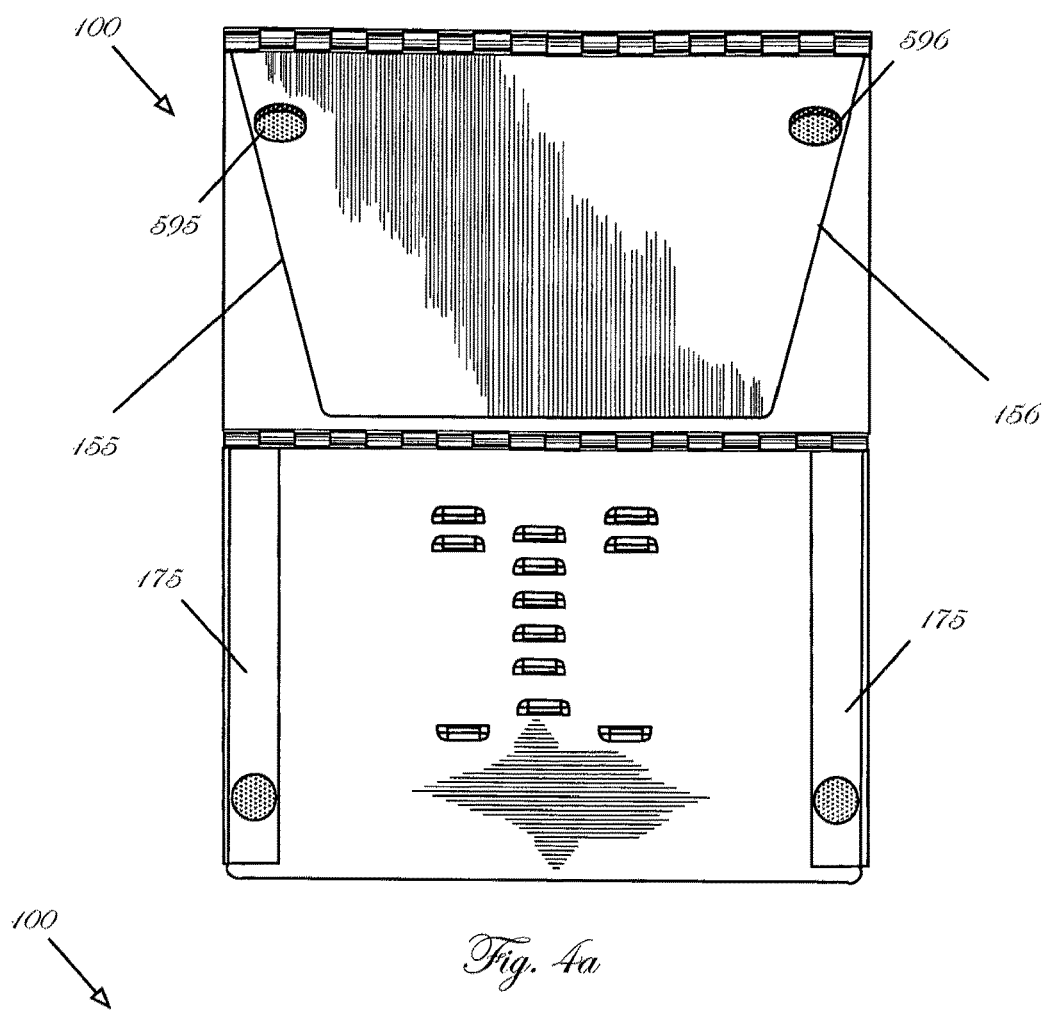
FIG. 4a is a plan view of a preferred embodiment of the present invention.
Figure 4B:
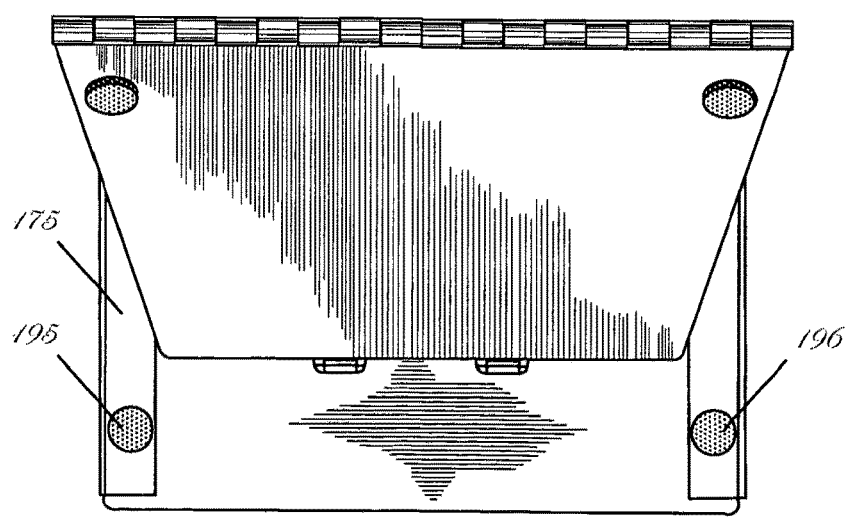
FIG. 4b is a plan view of a preferred embodiment of the present invention.

More specifically, FIGS. 4a-4b illustrate that in some preferred embodiments, the two side edges of the bottom panel (the edges which are perpendicular to the edge having the bull nose and hinge) have a folded aluminum "hem" edge formed along their length. These hem edges stiffen the bottom panel, since it doubles the thickness of the aluminum material for a distance of 1⅛" to 1¼" extending in from each edge. This creates a more stable support for the support device, and substantially eliminates any bounce in the unit when under stress at lower angles of the base panel.

FIG. 4b illustrates that in some preferred embodiments, two rubber pads 195, 196, are added to each hem edge to cushion between panels and when the support device is at its lowest position, or closed position, to prevent pinching of a user's fingers and to provide a gap spacing for cooling. Rubber pads are also be fastened to the back surface of support panel to provide further cushioning. In some preferred embodiments, this fastening may be accomplished through use of a high quality adhesive material.

FIG. 4a illustrate that in some preferred embodiments, another pair of support pads 595, 596 are affixed to the sides of the support panel. Support pads are sized and positioned such that they cooperate with the rubber pads 195, 196 disposed on the bottom panel.

Figure 3:
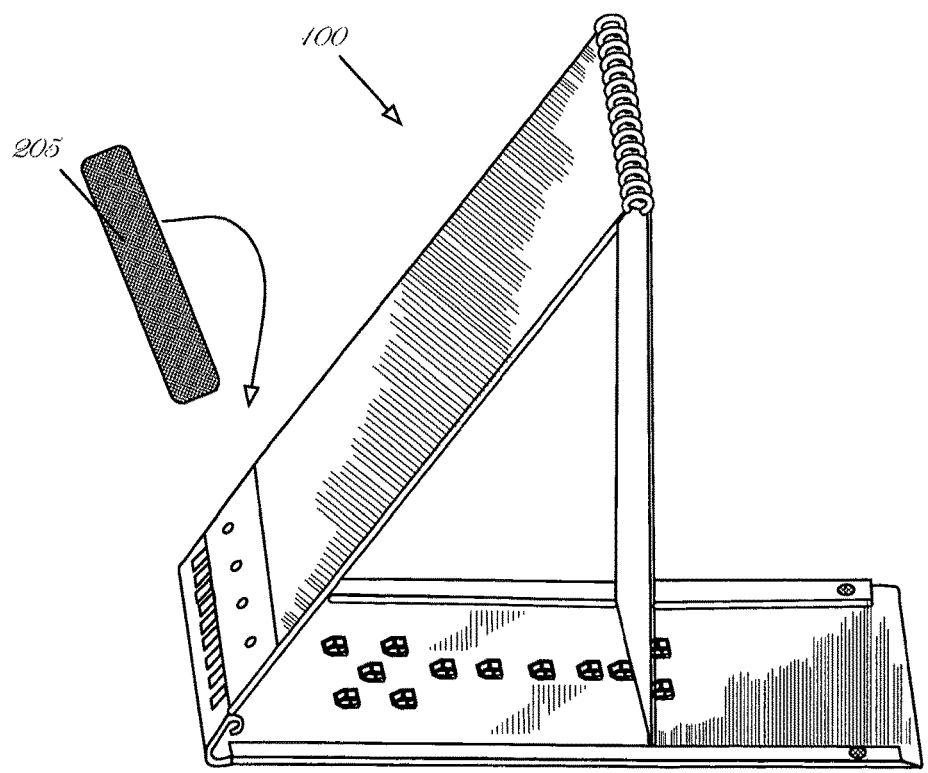
FIG. 3 shows a side view of the support device according to the present invention in a first raised position.

The inventive support device only uses gravity to hold the laptop or other item placed on the base panel and securely holds the weight of the item due to a ledge positioned at the bottom of the base panel. The ledge 185 is best seen in FIG. 3. It provides a resting place for the laptop or other item placed on the base panel and protects the laptop from sliding downward and off the support device when the base panel is raised at an angle. FIG. 15 illustrates that in some preferred embodiments, the indentation of the ledge enables a user to access the joint at which a laptop clamshell may be opened.

Wrist pad 205 provides a comfortable surface for a user to rest his or her hands on during use of the support device. Wrist pad is preferably constructed using a rigid aluminum L-shaped frame 301, to form the ledge and thereby create a solid support for the laptop or book.

The wrist pad has a neoprene or foam filling 300 to create padding. This foam filling and L-shaped frame are then covered with Lycra, neoprene, or some similar covering 302, to give the wrist pad a soft, durable and stain resistant surface.

FIG. 16 illustrates that in some preferred embodiments, this covering is preferably attached to the aluminum frame of the wrist pad with a high quality adhesive and is folded behind the wrist pad frame when the wrist pad frame is attached to panel, creating a long lasting bond by compression of the two parts part to base panel. This design also gives a comfortable resting place for the hands or wrists of the user.

The ledge is attached to base panel in a conventional manner, e.g., using screws, bolts or rivets. FIGS. 7-12 show various detail views of the wrist pad.

The foam rubber piece preferably has an adhesive backing 325 for enabling it to be fastened to the surface of frame. Frame preferably includes pre-mounted nuts (e.g. "Pem Nuts") for facilitating the fastening of the assembled wrist pad to base panel.

FIG. 12 is a cutaway end view of the wrist pad, showing the assembled L-shaped frame 301, the foam rubber filling 300, and the Lycral-neoprene covering 302, and the fastening of the wrist frame to the base panel in a conventional manner using a pre-mounted nut and a screw. FIG. 11 is an end view of the assembled wrist pad, and FIG. 10 is a partially cutaway perspective view of the assembled wrist pad showing a different view of the components.

In a preferred embodiment, the inventive support device is constructed of aluminum to thereby provide a natural cooling surface and to make it possible to have the laptop remain on the support device when it's battery(s) is being charged, not just during use of the laptop. It protects the computer from overheating, plus it protects the furniture and the user from the heat generated by the laptop during use. The surface of the panel can be kept as a solid surface, or a pattern of holes may be punched, or cut into it in a conventional manner (not shown in the FIGs.), to thereby create more breathability due to air being able to flow through the resting surface to the laptop and for aesthetics.

The support device is also reasonably lightweight, easy to transport due to its size and compactness, versatile in most any position or purpose and comfortable. The stand is also attractive with its anodized finish from clear to an array of colored anodizing drag. The stand has a neoprene or rubber covering on the bottom of the unit to protect the user and the surfaces the support device is resting on.

It should be understood that the portable support device described herein is not inherently related to any particular apparatus and may be implemented by any suitable and similar functioning combination of components. Further, various types of general purpose devices may be used in accordance with the teachings described herein.

The present invention has been described in relation to particular examples, which are intended in all respects to be illustrative rather than restrictive. Those skilled in the art will appreciate that many different combinations of hardware will be suitable for practicing the present invention.

Moreover, other implementations of the invention will be apparent to those skilled in the art from consideration of the specification and practice of the invention disclosed herein. Various aspects and/or components of the described embodiments may be used singularly or in any combination in the server arts. It is intended that the specification and examples be considered as exemplary only, with a true scope of the invention being indicated by the following claims.

What is claimed is:

1. A portable configurable support device comprising:
a base panel; a ledge positioned at the bottom of the base panel for enabling an item to rest on the base panel;
a bottom panel;
the bottom panel comprises an anterior side and two side edges, wherein each side edge is perpendicular to the anterior and the posterior side;
a support panel;
a first hinge for connecting the base panel to the bottom panel along one edge of each panel;
a second hinge for connecting the base panel to the support panel along an opposite edge of the base panel;
wherein a plurality of stops are formed in the bottom panel for enabling the edge of the support panel that is opposite to the second hinge to be positioned therein, to thereby enable the base panel to be positioned at a desired angle of incline with respect to the plane defined by the bottom panel;
a plurality of co-aligned rubber air gap bumpers located on the support and bottom panels wherein the air gap bumpers maintain an air gap for natural cooling;
wherein the side edges of the bottom panel further define folded hem edges formed along their length for increasing the strength of the support to the bottom panel to lessen a bounce in the first up position due to the radical angle of the support panel in relation to the bottom panel;
a hem edge on the bottom panel wherein the hem edge is formed in a "C" shape for increasing the strength of the support of that given hem edge to add structure to the bottom panel to lessen a bounce in the first up position due to the radical angle of the support panel in relation to the bottom panel; and
a set of rubber pads and a set of support pads to maintain an air gap between the base panel and the bottom panel for cooling, wherein the set of rubber pads are fastened to each hem edge and the set of support pads are fastened to a back surface of the support panel wherein when the support device is in a closed position. the sets of rubber and support pads contact each other to prevent pinching of a user's fingers.

* * * * *